United States Patent [19]  [11] 4,176,847
Akai et al.  [45] Dec. 4, 1979

[54] DEVICE FOR PREVENTING SLIPPING OF TURNTABLE OUT OF SHAFT

[76] Inventors: Norio Akai; Nobumasa Inoue; Kazuo Ohtani, all of No. 1006, Oaza Kadoma, Kadoma City, Osaka, Japan

[21] Appl. No.: 872,753

[22] Filed: Jan. 27, 1978

[30] Foreign Application Priority Data

Jan. 31, 1977 [JP] Japan .................................. 52-10005

[51] Int. Cl.² ............................................... G11B 3/60
[52] U.S. Cl. .................................................. 274/39 R
[58] Field of Search ............... 274/10 S, 10 SS, 39 A, 274/39 R

[56] References Cited
U.S. PATENT DOCUMENTS 3,241,840  3/1966  Freier .................................... 274/39
4,012,048  3/1977  Hawkins ............................ 274/39 R Primary Examiner—John W. Shepperd
Attorney, Agent, or Firm—Gajarsa, Liss & Conroy

[57] ABSTRACT

The invention relates to a device for preventing a turntable for a record player from slipping off a shaft rotatably extending through a boss made of a metal fixed to the turntable. The turntable has integrally formed therewith slot means for receiving two bent ends of leg portions of a generally U-shaped retainer spring and a plurality of support projections. With the slot means and the plurality of support projections, the retainer spring is mounted to the turntable such that the leg portions thereof extend substantially in parallel to each other and across a circular axial end of the boss. The shaft is formed with a radial groove to receive the leg portions of the retainer spring. The plurality of support projections will serve as a spacer to keep the leg portions apart to prevent interference contact bwtween the leg portions and a bottom wall of the radial groove which otherwise would hamper smooth rotation of a turntable.

3 Claims, 5 Drawing Figures

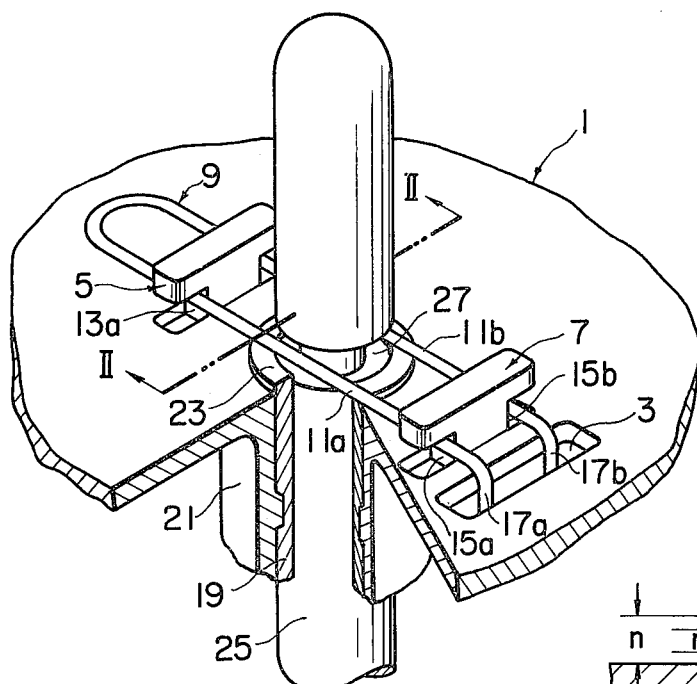
FIG. 1
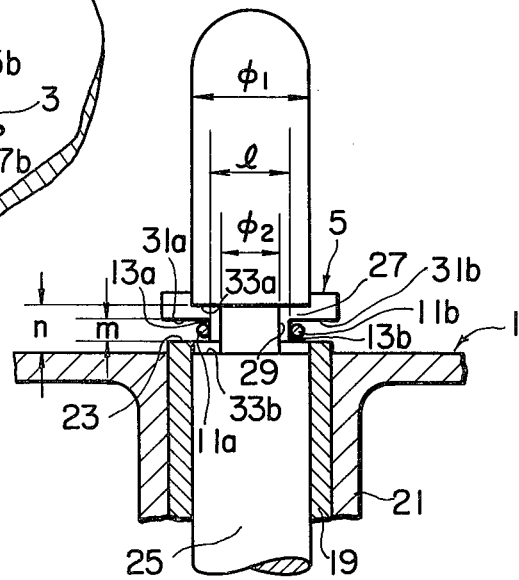
FIG. 2
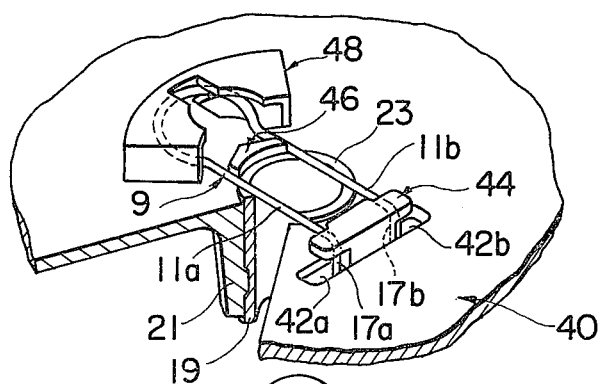
FIG. 3
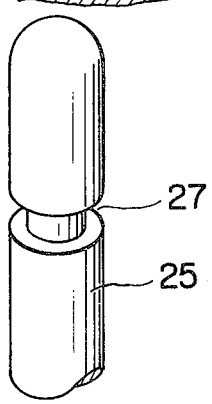

DEVICE FOR PREVENTING SLIPPING OF TURNTABLE OUT OF SHAFT

BACKGROUND OF THE INVENTION

This invention relates to a record player in which a turntable is rotatable about a shaft and more particularly to a device for preventing a turntable from slipping off the corresponding shaft by limiting relative axial movement of the turntable and the corresponding shaft.

In such a record player as above, a boss or bushing of a metal is fixed to a turntable by integrally forming the boss with the turntable or by press-in fitting the boss into a hub of the turntable, for example. The turntable is formed with slot means for receiving two bent ends of leg portions of a generally U-shaped retainer spring. The leg portions of the spring retainer extend across two cutouts, respectively, formed in the boss. The shaft is formed with a radial groove to receive the two leg portions of the retainer spring. With the slot means and the two cutouts formed in the boss, the retainer spring is mounted to the turntable such that the leg portions of the retainer spring are kept received in the radial groove of the shaft, thus limiting relative axial movement of the turntable and the shaft so that the turntable is prevented from slipping off the shaft (see FIG. 5). A problem with this device for preventing slipping of a turntable out of a shaft resides in that the process of forming a boss of metal with cutouts, which is necessary in manufacturing the device, is complex, thus reducing the productivity and increasing the manufacturing cost. Another problem resides in that unless the cutouts formed in a metallic boss are machined with great accuracy as designed, the interference contact between the leg portions of a generally U-shaped retainer spring and the bottom wall of a radial groove of a shaft which would hamper smooth rotation of the corresponding turntable is likely to occur.

SUMMARY OF THE INVENTION

It is a main object of the invention to provide a device for preventing slipping of a turntable off the corresponding shaft, the device being free of problems encountered in the prior art as mentioned above.

It is another object of the invention to provide a device, simple in manufacture, for preventing slipping of a turntable off the corresponding shaft, which device insures smooth rotation of the turntable.

BRIEF DESCRIPTION OF THE DRAWINGS

FIG. 1 is a fragmentary perspective view, partly in section, of a record player showing a first preferred embodiment of a device for preventing turntable from slipping off of the corresponding shaft according to the invention;

FIG. 2 is a fragmentary sectional view taken through line II—II in FIG. 1 showing the dimensional relationships;

FIG. 3 is a fragmentary perspective view similar to FIG. 1 showing a second preferred embodiment of the invention, a shaft being detached from the corresponding turntable;

DETAILED DESCRIPTION OF THE DRAWINGS

Figure 4:
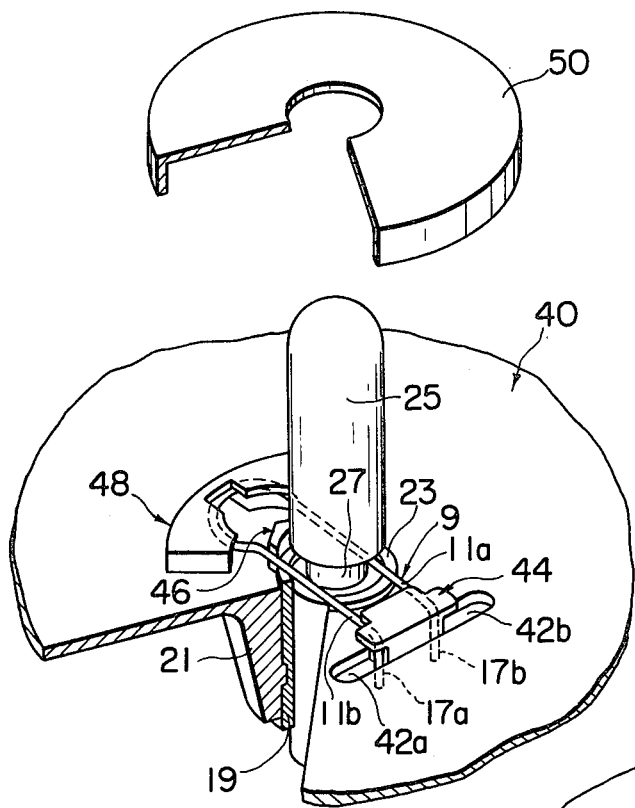
FIG. 4 is a fragmentary perspective view showing an application of the second embodiment in a record player having a turntable with an EP adaptor.

Referring to the accompanying drawings, FIGS. 1 and 2 show a device of the invention for preventing a turntable from slipping off the corresponding shaft about which the turntable is rotatable.

In FIG. 1 a turntable 1, which is preferably made of a synthetic resin, has integrally formed therewith a slot 3 and two generally T-shaped support projections 5 and 7. A generally U-shaped retainer spring 9 is mounted to the turntable 1 with its leg portions 11a and 11b in bearing engagement with two opposed perpendicular walls 13a and 13b (see FIG. 2) of the one T-shaped support projection 5, respectively, and also in bearing engagement with two opposed perpendicular walls 15a and 15b of the other T-shaped support projection 7, respectively. The leg portions 11a and 11b terminate in bent ends 17a and 17b, respectively, which engage in the slot 3. A boss or bushing 19 such as of a metal is fixed to the turntable 1 within a hub 21 of the latter. The boss 19 may be integrally formed with the turntable 1 or press-in fitted into the hub 21 of the turntable 1. The leg portions 11a and 11b extend in substantially parallel to each other and across a circular axial end 23 of the boss 19. Rotatably extending through the boss 19 is a shaft or spindle 25 formed with a radial groove 27 for receiving the leg portions 11a and 11b of the retainer spring 9 as shown in FIGS. 1 and 2.

As best seen in FIG. 2 the leg portions 11a and 11b are kept apart by the T-shaped support projections 5 and 7 by a distance l and extend across the radial groove 27 without contacting with an axial bottom wall 29 of the radial groove 27. The axial bottom wall 29 of the radial groove 27 defines a educed diameter section of the shaft 25, as will be readily noted from the Figure. The distance l must satisfy the relationships, that is, $\phi_1 > l > \phi_2$, where $\phi_1$ is the diameter of the shaft 25 and $\phi_2$ is the diameter of the shaft 25 at its reduced diameter section.

The axial distance m between the circular axial end 23 of the boss 19 and one of two lateral walls 31a and 31b of the T-shaped support projection 5 is shorter than the axial distance n between two opposite radial walls 33a and 33b of the radial groove 27, as seen in FIG. 2. The axial distance m may be an axial distance as measured axially from the circular end 23 of the boss 19 to one of two lateral walls, not identified, of the T-shaped support projection 7. In assembly, the shaft 25 is preferably arranged as shown in FIG. 2 so that in the sectional view as shown in FIG. 2, the lateral walls, such as 31a or 31b, of each of the T-shaped support projections 5 and 7 and the circular axial end 23 of the boss 19 are disposed within a space between the two opposite radial walls 33a and 33b of the radial groove 27.

It will be noted that since movement of the retainer spring 9 in an axial direction away from the turntable 1 is limited by the lateral walls, such as 31a and 31b, of the T-shaped support projections 5 and 7, and since movement of the retainer spring 7 in a radial direction away from the shaft 25 is limited by the slot 3 receiving the bent ends 17a and 17b, the retainer spring 9 will be kept in an optimum relationship with the radial groove 27 of the shaft 25 once it has been mounted to the turntable 1.

Referring to a second embodiment of the invention shown in FIG. 3, a turntable 40 used in this embodiment differs from the counterpart 1 shown in FIGS. 1 and 2 in that the turntable 40 has integrally formed therewith two slots 42a and 42b arranged adjacent to and on the opposite sides of a first support projection 44 which has the same function as the support projection 7 shown in FIG. 1, a second support projection 46 interposed between leg portions 11a and 11b of a generally U-shaped retainer spring 9 and acting as a spacer, and a third support projection 48 formed with a space to receive the bottom portion of a U of the retainer spring 9. It will be noted that in the embodiment shown in FIG. 3, the second and third support projections 46 and 48 cooperate with each other to perform the same function as the support projection 5 shown in FIG. 1 does.

In the case of the device shown in FIG. 3, the generally U-shaped retainer spring 9 can be assembled to the illustrated position only by spreading the leg portions 11a and 11b with the bottom portion of the U of the retainer spring 9 inserted into the third support projection 48 and the engaging the bent ends 17a and 17b in the slots 42a and 42b, respectively.

It will be noted that since, in the device shown in FIG. 3, the third support projection 48 externally engages the bottom portion of the U of the retainer spring 9, a generally U-shaped retainer spring which is shorter, in length, or more compact than the counterpart shown in FIG. 1, can be used in the device shown in FIG. 3. Thus, the device shown in FIG. 3 is suitable for use with an EP adaptor 50 as shown in FIG. 4 because the device as shown in FIG. 3 can be accommodated within a circular recessed area (not shown) on a turntable. Therefore, the device as shown in FIG. 3 is more practical than the device shown in FIG. 1. Since the device is disposed within an area recessed from a surface on the turntable on which a record will be placed, the arrangement of such a device will not hamper the placing of a record on the turntable.

Figure 5:
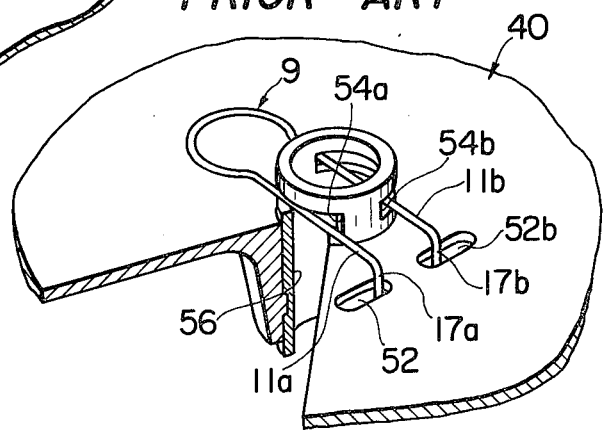
FIG. 5 is a fragmentary perspective view showing the before mentioned prior art device for preventing a turntable from slipping out of the corresponding shaft.
Figure 5:
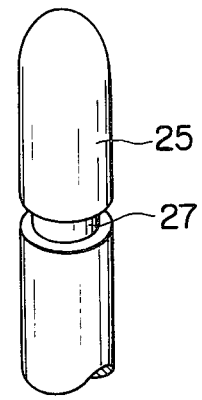

Referring to FIG. 5, the before mentioned prior art device for preventing slipping of a turntable off the corresponding shaft is shown in which a turntable 50 is formed with slot means 52a and 52b for receiving two bent ends 17a and 17b of a generally U-shaped retainer spring 9 having two leg portions 11a and 11b which extend across two cutouts 54a and 54b formed in a boss 56 of a metal so as to appropriately extend through a radial groove 27 formed in a shaft 25.

It will now be understood from the foregoing description regarding FIGS. 1-4 as compared to the description of FIG. 5 that the step of forming a boss of a metal with cutouts 54a and 54b for receiving leg portions of a generally U-shaped spring 9 has been made unnecessary. The structure has been replaced with a plurality of support projections and slot means which are formed, in one step, integrally with a turntable. Thus a device according to the invention is suitable for mass production as compared to the prior art device. Moreover the device of the invention is simple in construction.

What is claimed is:

1. A device for preventing slipping of a turntable off a shaft by limiting relative axial movement of the turntable having a boss fixed thereto and the shaft rotatably extending through said boss, the turntable having a generally U-shaped spring having two leg portions terminating in bent ends, respectively, the turntable having integrally formed therewith slot means for receiving the bent ends of the U-shaped spring and a plurality of support projections engaging the generally U-shaped retainer spring to mount the generally U-shaped retainer spring to the turntable, the plurality of support projections and the slot means being configured and arranged such that the generally U-shaped retainer spring is arranged so that the leg portions thereof extend substantially parallel to each other and across a circular axial of end of said boss, the shaft being formed with a radial groove which receives the leg portions of the generally U-shaped retainer spring, said plurality of projections comprising a first projection, having two opposed faces, which is interposed between said two leg portions by internally and bearingly engaging said two leg portions, respectively, and two lateral portions extending from said two opposed faces respectively;

a second projection interposed between said two leg portions and internally engaging them; and a third projection formed with a space to receive the bottom of the U of said generally U-shaped spring.

2. A device as claimed in claim 1, in which said two leg portions are held spaced by one of said supports from the bottom wall of said radial groove of said shaft and spaced a distance l with each other, the distance l being within the range between $\phi_2$ and $\phi_1$, where $\phi_1$ is the diameter of a cross section of said shaft and $\phi_2$ is the diameter of a cross section of said shaft taken through said radial groove.

3. A device as claimed in claim 1, in which said turntable is made of a synthetic resin.

* * * * *